(12) United States Patent
Khosravi et al.

(10) Patent No.: US 9,740,502 B2
(45) Date of Patent: **\*Aug. 22, 2017**

(54) VIRTUAL BUS DEVICE USING MANAGEMENT ENGINE

(71) Applicant: Intel Corporation, Santa Clara, CA (US)

(72) Inventors: Hormuzd M. Khosravi, Portland, OR (US); Ajith K. Illendula, Albuquerque, NM (US); Ned M. Smith, Hillsboro, OR (US); Yasser Rasheed, Beaverton, OR (US); Tracy L. Zenti, Hillsboro, OR (US); Bryan K. Jorgensen, Portland, OR (US)

(73) Assignee: Intel Corporation, Santa Clara, CA (US)

(\*) Notice: Subject to any disclaimer, the term of this patent is extended or adjusted under 35 U.S.C. 154(b) by 113 days.

This patent is subject to a terminal disclaimer.

(21) Appl. No.: 14/272,584

(22) Filed: May 8, 2014

(65) Prior Publication Data

US 2014/0281468 A1 Sep. 18, 2014

Related U.S. Application Data

(63) Continuation of application No. 12/636,884, filed on Dec. 14, 2009, now Pat. No. 8,762,698.

(51) Int. Cl.
*G06F 9/44* (2006.01)
*G06F 13/10* (2006.01)
*G06F 13/40* (2006.01)

(52) U.S. Cl.
CPC .......... *G06F 9/4416* (2013.01); *G06F 13/105* (2013.01); *G06F 13/4027* (2013.01)

(58) Field of Classification Search
CPC ... G06F 9/4416; G06F 13/105; G06F 13/4027
See application file for complete search history.

(56) References Cited

U.S. PATENT DOCUMENTS

| 6,629,157 | B1 | 9/2003 | Falardeau |
| 6,823,418 | B2 | 11/2004 | Langendorf et al. |
| 7,353,377 | B2 | 4/2008 | Ong |
| 7,945,721 | B1 * | 5/2011 | Johnsen ............... G06F 13/385 710/10 |

(Continued)

FOREIGN PATENT DOCUMENTS

| CN | 1737780 A | 2/2006 |
| CN | 101059791 A | 10/2007 |

(Continued)

OTHER PUBLICATIONS

CN office action in corresponding CN application No. 201010600754.2 dated Mar. 5, 2013 (11 pages).

(Continued)

*Primary Examiner* — M Elamin
(74) *Attorney, Agent, or Firm* — Trop Pruner & Hu, P.C.

(57) ABSTRACT

A management engine may be used to trap configuration cycles during the boot process and thereafter in response to operating system enumeration. As a result, a virtual bus device can be created. The bus device may be used to provision software to the platform even when the operating system is corrupted or non-functional.

21 Claims, 4 Drawing Sheets

(56) References Cited

U.S. PATENT DOCUMENTS

| | | | |
|---|---|---|---|
| 7,966,616 B2 | 6/2011 | Arndt | |
| 8,028,105 B2 | 9/2011 | Arndt | |
| 8,117,346 B2* | 2/2012 | Oshins | G06F 9/468 710/2 |
| 8,700,816 B2* | 4/2014 | Oshins | G06F 9/468 710/10 |
| 8,762,698 B2* | 6/2014 | Khosravi | G06F 9/4416 710/107 |
| 2006/0059330 A1 | 3/2006 | Ong et al. | |
| 2006/0136612 A1 | 6/2006 | Aslot et al. | |
| 2006/0259902 A1 | 11/2006 | Lin | |
| 2008/0184221 A1* | 7/2008 | Rengarajan | G06F 8/65 717/173 |

FOREIGN PATENT DOCUMENTS

| | | |
|---|---|---|
| EP | 2079019 A1 | 7/2009 |
| JP | 2002108484 A | 4/2002 |
| JP | 2005-193414 | 7/2005 |
| JP | 2005-352598 | 12/2005 |
| JP | 2008269210 A | 11/2008 |
| KR | 20040017818 A | 2/2004 |

OTHER PUBLICATIONS

CN office action in corresponding CN application No. 201010600754.2 dated Nov. 26, 2013 (7 pages).
CN office action in corresponding CN application No. 201010600754.2 dated Jun. 16, 2014 (3 pages).
CN office action in corresponding CN application No. 201010600754.2 dated Dec. 26, 2014 (9 pages).
EP search report in corresponding EP application No. 10252027.7 dated Jul. 7, 2011 (3 pages).
EP office action in corresponding EP application No. 10252027.7 dated Aug. 10, 2011 (6 pages).
JP office action in corresponding JP application No. 2010242568 dated Sep. 18, 2012 (4 pages).
KR office action in corresponding KR application No. 10-2010-0127845 dated Dec. 26, 2013 (3 pages).

* cited by examiner

PROCESSOR ADDRESS SPACE
-MEMORY MAP

VIRTUAL BUS DEVICE USING MANAGEMENT ENGINE

CROSS-REFERENCE TO RELATED APPLICATIONS

This application is a continuation of U.S. patent application Ser. No. 12/636,884, filed on Dec. 14, 2009 now U.S. Pat. No. 8,762,698.

BACKGROUND

This relates generally to management engines.

A management engine or service processor is an isolated and protected computing resource. It provides information technology management features independent of any installed operating system, including allowing improved management of corporate assets and a standardized corporate assets management technology. It includes firmware that provides management features for clients. It also allows system administrators to remotely manage a platform that has the management engine on it.

The management engine may include a host embedded controller interface (HECI), which is a bidirectional bus that allows the host operating system to communicate directly with the management engine, exchanging system management information in events. HECI enables the host operating system to control other devices, such as out-of-band controllers, wakeup on local area network, and power supply devices, as examples.

The management engine is an embedded controller running a lightweight microkernel operating system that provides a low power, out-of-band execution engine for management services. At system initialization, the management engine loads its code from system flash memory. This allows it to be up and running before the main operating system is started.

For run time data storage, the management engine may access to a protected memory at run time, in addition to a small amount of on-chip cache memory for faster or more efficient processing. In some cases, the protected memory may be a protected area of system memory. One feature of the management engine is that its power states are independent of the host operating system power states. This allows it to be up and running when the central processing unit and other components of the system are in deep sleep states.

As a result, the management engine can be a fully functioning component as soon as power is applied to the system. This allows it to respond to out-of-band commands from information technology management consoles without having to wake up the rest of the system, thereby reducing power consumption.

In order for the management engine to access the network while the host operating system is absent, the management engine uses direct access to network interfaces. The management engine manageability services share the Internet Protocol address of the host operating system, by using specific and dedicated transport level (Level 4) ports to distinguish manageability traffic from regular host traffic.

In many cases, it is desirable to provision software to a platform. A platform is simply any computer-based device that uses software. In some cases, it may be desirable to provide updates to platforms after they have already been distributed to end users. In other cases, new software may be distributed to those users. In addition, drivers may be provided as well.

DETAILED DESCRIPTION

In accordance with some embodiments, a platform may have a configurable virtual bus device, enabling automatic firmware and software updates and other web services. This generic mechanism can be implemented in hardware and may be used to provide configurable virtual bus devices, which, in turn, may assist with software delivery. Other usages include providing firmware and driver updates and pre-silicon hardware design and debugging. The virtual bus device may be implemented securely by a management engine, in which case it is independent of the platform operating system. Therefore, updates may be provisioned even when the operating system is corrupted.

Figure 1:
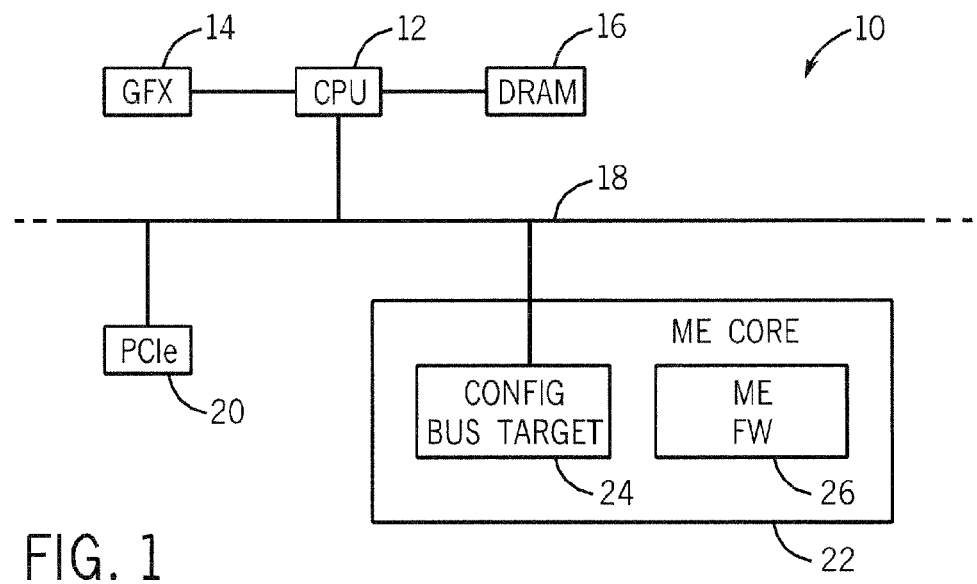
FIG. 1 is a schematic depiction of one embodiment of the present invention.

Referring to FIG. 1, in accordance with one embodiment, a platform 10 may include a central processing unit 12, coupled to a graphics processor (gfx) 14 and a dynamic random access memory (dram) 16. The processor 12 may be coupled to a bus 18, which, in one embodiment, has a Peripheral Component Interconnect or a PCI bus and, in particular, may be a PCI Express bus, in accordance with one embodiment. See PCI Express (PCIe) 2.0 Base Specification (Jan. 15, 2007) available from PCI-SIG, Beaverton, Oreg. 97006.

Connected to the bus 18 may be bus devices 20. In addition, a management engine core 22 may also be coupled to the bus 18. The management engine core may include management engine firmware 26 and a configuration bus target 24. The bus target 24 appears like an actual bus device and, therefore, enables the management engine core 22 to trap configuration cycles both from the basic input/output system (BIOS) during boot up and from the operating system (OS) during enumeration thereafter.

Figure 2:
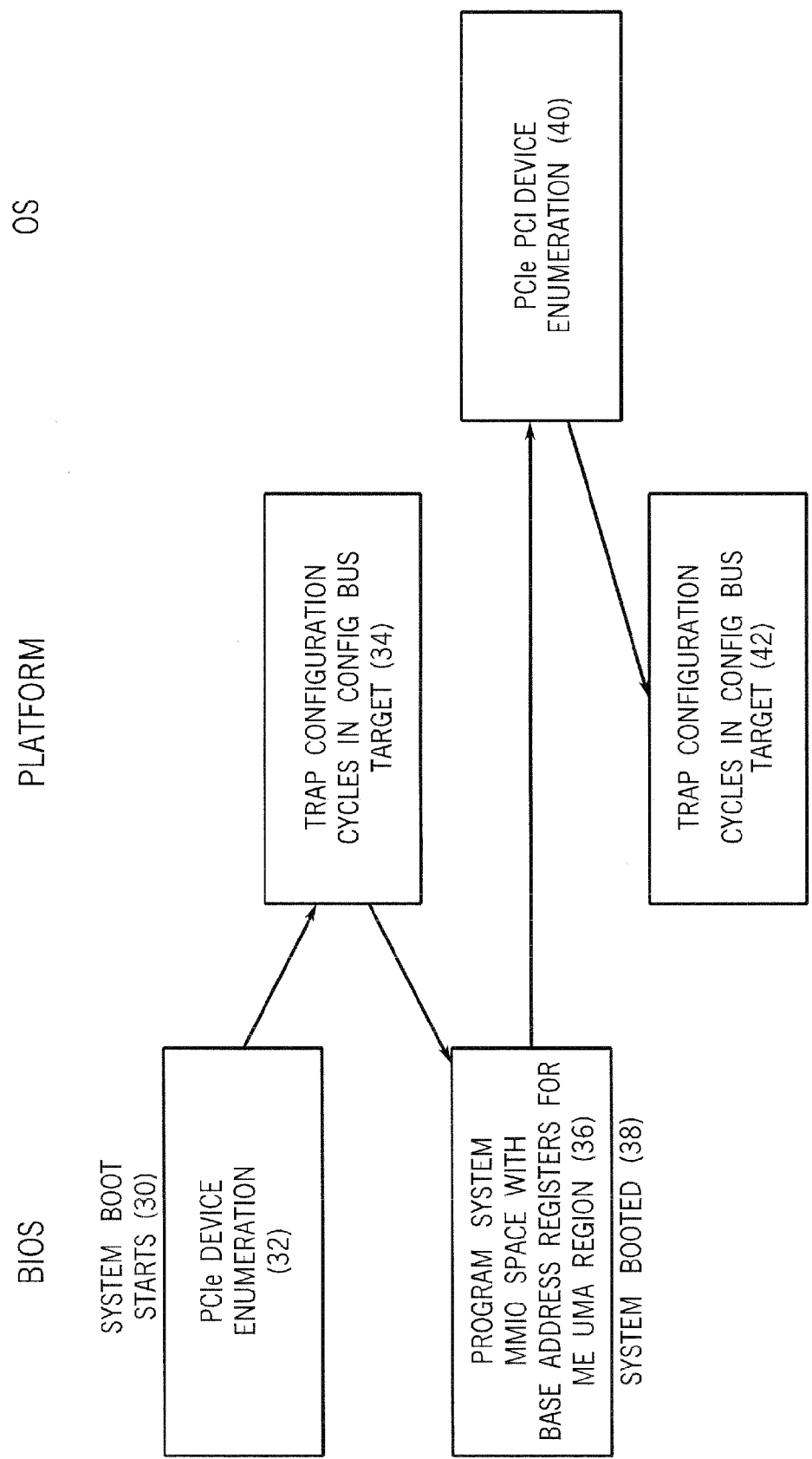
FIG. 2 is a flow chart for one embodiment of the present invention.

Referring to FIG. 2, the platform, independently of the management engine in one embodiment, operates first in a boot up period 30 under control of the basic input/output system and then after boot up, under control of the operating system. The sequence of FIG. 2 may be implemented, in some embodiments, in firmware, software, or hardware. In a software embodiment, the sequence of FIG. 2 may use instructions that are executed by a controller or computer resident within the management engine core 22, for example. The instructions are executed by any controller or processor and may be stored in any suitable storage, including a computer readable medium, such as semiconductor memory, an optical memory, or a magnetic memory.

During the system boot process, under control of the basic input/output system, the device enumeration begins, as indicated at 32. The platform traps the configuration cycles in the configuration bus target, as indicated at 34. The platform, independently of the management engine in one embodiment, then sends a response to the basic input/output system. The basic input/output system programs the memory mapped input/output (MMIO) space of the processor with base address registers for the management engine uniform memory access (UMA) region, as indicated at 36. Then, the system boots, as indicated at 38. Thereafter, the operating system begins its own bus device enumeration, as indicated at 40. Again, the platform traps the configuration cycles in the configuration bus target 42. As a result, the configuration bus target makes the configuration system believe that there is actually another bus device. This bus device may be called a virtual device because it does not exist in the form in which it is enumerated. This allows the management engine to provide services as if it were a bus device in a secure way which is configurable under control of the management engine.

The management engine firmware has the logic for secure provisioning of the virtual bus device identifier and trapping bus configuration requests. The secure provisioning of the virtual bus device may use protocols, such as Client Initiated Remote Access (CIRA), that the management engine firmware already supports in some embodiments. Thus, the management engine firmware will respond to the bus configuration requests that are sent to it via the bus hardware.

The bus configuration target device hardware is responsible for providing bus device identifiers for the management engine. It acts as a bus target device, trapping on bus configuration requests that are sent by the bus and sending that information to the management engine firmware.

Figure 3:
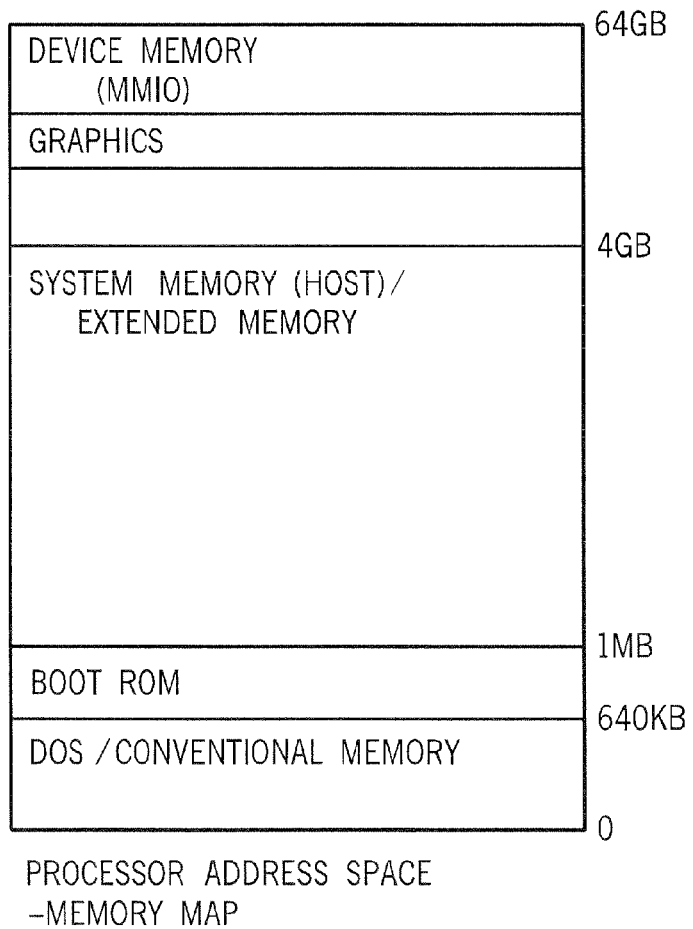
FIG. 3 is a depiction of processor address space and memory map for one embodiment.

In some embodiments, the processor address space or memory, shown in FIG. 3, includes the memory map input/output memory space, as indicated, graphics system memory, boot read only memory, and disk operating system in conventional memory, as also indicated.

Figure 4:
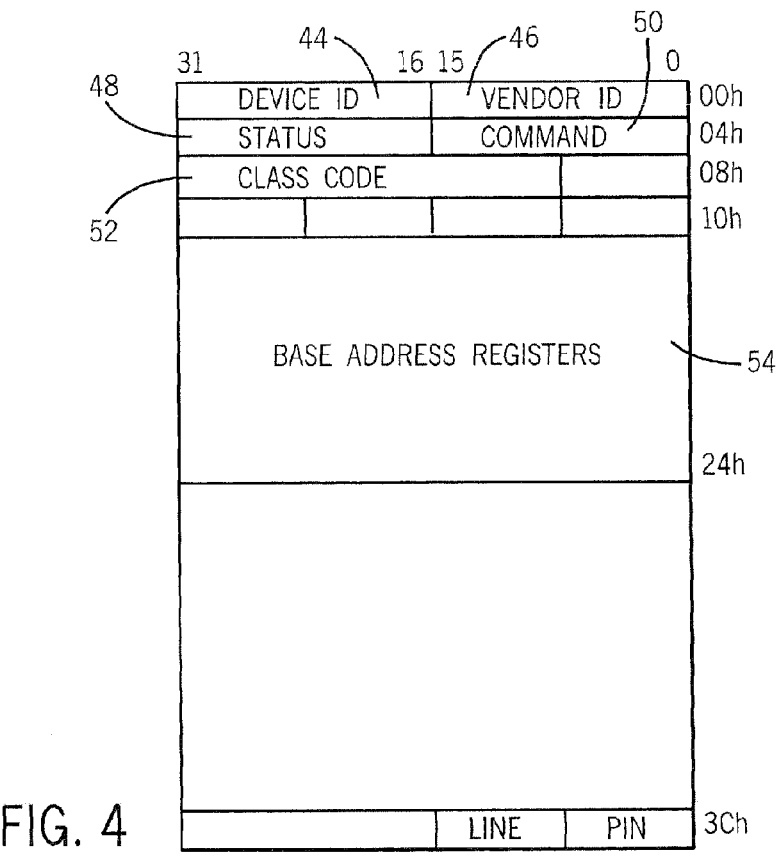
FIG. 4 is a map of the memory mapped input/output space in accordance with one embodiment.

The device memory mapped input/output (MMIO) space, shown in FIG. 4, is where the bus configuration registers for the virtual device are mapped into host memory. The bus configuration space includes a vendor identifier 46 from bits 0 to 15 at address OOh, a device identifier 44 at bits 16 to 31 at O4*h*, the command 50 and the status 48. At O8*h*, it includes the class code 52. From 24*h* to 10*h*, it includes the base address registers 54.

Figure 5:
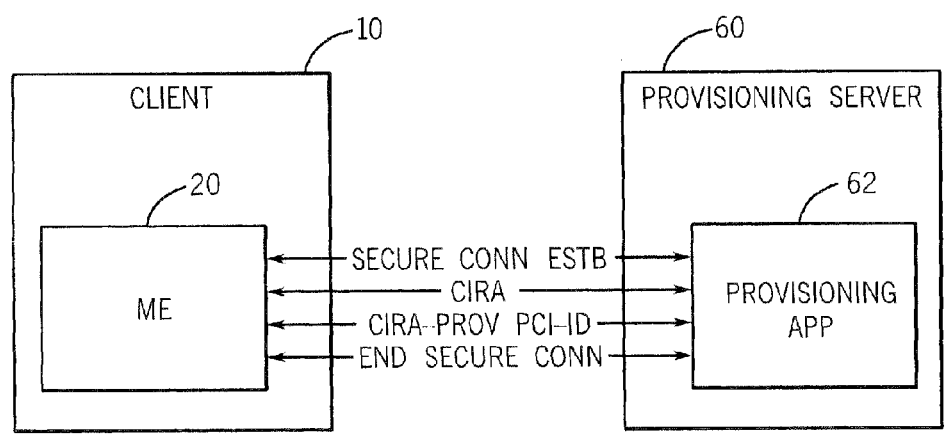
FIG. 5 is a schematic depiction depicting secure provisioning of a management engine for a generic PCI device ID according to one embodiment.

Referring to FIG. 5, for secure provisioning of software, software updates, drivers, and the like (provisioning app 62) of a virtual bus device ID in the management engine, begins with the management engine firmware being pre-provisioned with the fully qualified domain name (FQDN) of the provisioning server 60 over the Internet. When the management engine firmware 20 boots up, during the first system boot, the management engine firmware may check the management engine firmware to find out if it has been provisioned with a virtual PCI device ID in one embodiment.

Figure 6:
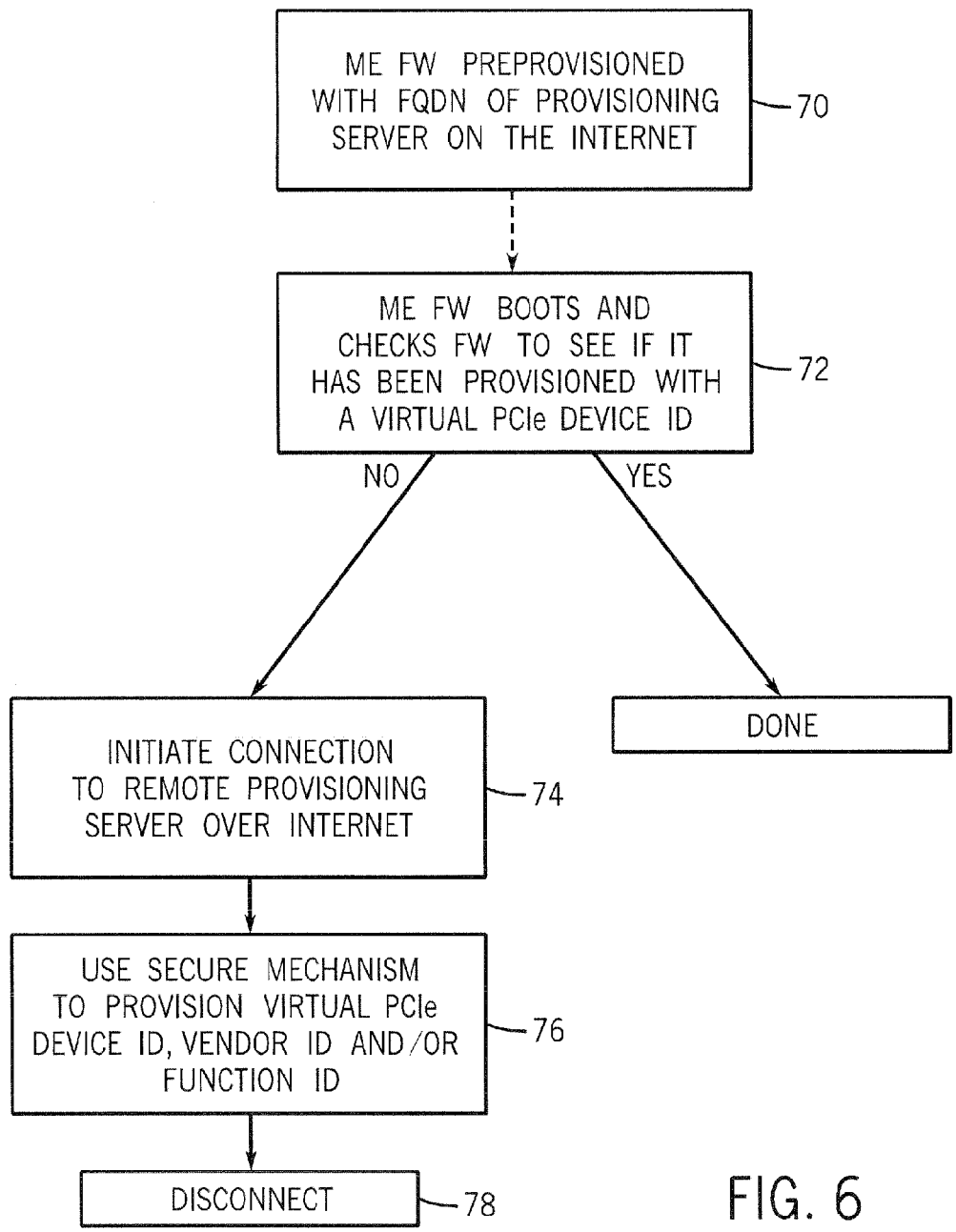
FIG. 6 is a flow chart for software provisioning in accordance with one embodiment.

Thus, referring to FIG. 6, the pre-provisioning is indicated at 70 and, after booting the sequence checks for the device identifier (ID) at block 72. If the device ID is already present, then the flow is finished. Otherwise, a connection is initiated to the remote provisioning server over the Internet, as indicated at 74. Any secure mechanism, may be used to provision the management engine with the virtual bus device ID, vendor ID, and/or function ID for the device of the chipset is to simulate, as indicated in block 76. After provisioning is completed, the server disconnects with the management engine, as indicated at 78. The management engine firmware and PCI target firmware inside the management engine now simulate the PCI device as though a new piece of hardware is connected to the platform As a result, hardware may be used to remotely provision the platform with a bus device ID, as well as software updates, software, and drivers. Because it is done through the management engine, it is host operating system independent. That means that it can operate irregardless of the state of the host operating system. Because many of the components may already be present in the management engine, the consumer is provided a considerable value.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   trapping a configuration cycle in a target device within a management engine of a platform;
   creating a virtual bus device on said platform;
   programming a system memory mapped input/output space with base address registers for the virtual bus device via the management engine; and
   initiating a connection to the provisioning server over the Internet and obtaining a bus device identifier over the Internet via the connection.

2. The method of claim 1 including provisioning software on said platform from a provisioning server.

3. The method of claim 1 including trapping a configuration cycle during booting of said platform.

4. The method of claim 1 including trapping a configuration cycle after the platform has booted.

5. The method of claim 1 including checking upon booting to see if management engine firmware has been provisioned with a virtual device identifier.

6. The method of claim 1 including using a secure mechanism to provision the virtual device identifier, vendor identifier, or function identifier.

7. A non-transitory computer readable medium storing instructions executed by a computer to:
   trap a configuration cycle in a target device within a management engine of the platform;
   create a virtual bus device on said platform;
   program a system memory map input/output space with base address registers for the virtual bus device via the management engine; and
   initiate a connection to the provisioning server over the Internet and obtain a bus device identifier over the Internet via the connection.

8. The medium of claim 7 further storing instructions to use said virtual bus device to provision software on the platform.

9. The medium of claim 8 further storing instructions to provision software on said platform from a provisioning server.

10. The medium of claim 7 further storing instructions to trap a configuration cycle during booting of said platform.

11. The medium of claim 7 further storing instructions to trap a configuration cycle after the platform has booted.

12. The medium of claim 7 further storing instructions to provision management engine firmware with a domain name of a provisioning server.

13. The medium of claim 12 further storing instructions to check upon booting to see if management engine firmware has been provisioned with a virtual device identifier.

14. The medium of claim 7 further storing instructions to use a secure mechanism to provision a virtual device identifier, a vendor identifier, or a function identifier.

15. An apparatus comprising:
a processor;
a bus coupled to said processor;
a management engine coupled to said bus; and
a configuration bus target within said management engine, said bus target to trap a configuration cycle and to create a virtual bus device on said bus, said processor including a memory mapped input/output space with base address registers for the virtual bus device via the management engine, to initiate a connection to the provisioning server over the Internet and obtain a bus device identifier over the Internet via the connection.

16. The apparatus of claim 15, said virtual bus device to provision software on said apparatus.

17. The apparatus of claim 16, said configuration bus target to trap a configuration cycle during booting.

18. The apparatus of claim 15, said configuration bus target to trap a configuration cycle after booting.

19. The apparatus of claim 15, said management engine including firmware pre-provisioned with a domain name of a provisioning server.

20. The apparatus of claim 19, said management engine to check upon booting to see if the management engine firmware has been provisioned with a virtual device identifier.

21. The apparatus of claim 15, said management engine to use a secure mechanism to provision a virtual device identifier, vendor identifier, or function identifier.

* * * * *